(12) United States Patent
Shah et al.

(10) Patent No.: US 6,756,431 B2
(45) Date of Patent: Jun. 29, 2004

(54) HETEROCYCLIC TIN FLAME RETARDANTS/SMOKE SUPPRESSANTS AND HALOGEN-CONTAINING POLYMER COMPOSITION CONTAINING SAME

(75) Inventors: Mukund Shah, Hazlet, NJ (US); Michael H. Fisch, Wayne, NJ (US); Ulrich Stewen, Bedford, NY (US); Radu Bacaloglu, Hamburg, NJ (US)

(73) Assignee: Crompton Corporation, Middlebury, CT (US)

(*) Notice: Subject to any disclaimer, the term of this patent is extended or adjusted under 35 U.S.C. 154(b) by 0 days.

(21) Appl. No.: 10/119,443

(22) Filed: Apr. 9, 2002

(65) Prior Publication Data

US 2003/0195279 A1 Oct. 16, 2003

(51) Int. Cl.[7] .............. C08K 5/34; C08K 5/04; C08K 5/09; C08K 3/26; C07D 251/54
(52) U.S. Cl. .......... 524/100; 524/62; 524/100; 524/114; 524/296; 524/305; 524/394; 524/400; 524/424; 524/425; 524/430; 524/445; 524/447; 524/449; 524/451; 524/492; 524/494; 524/495; 544/196; 544/209; 544/210; 544/213; 544/218; 544/219
(58) Field of Search .............. 524/62, 100, 114, 524/296, 305, 394, 400, 424, 425, 430, 445, 447, 449, 451, 492, 494; 544/196, 209, 210, 213, 218, 219

(56) References Cited

U.S. PATENT DOCUMENTS

| | | | |
|---|---|---|---|
| 4,390,538 A | 6/1983 | Wehner et al. |
| 4,600,734 A | 7/1986 | von Bonin et al. |
| 4,670,494 A | 6/1987 | Semenza, Jr. |
| 4,950,757 A | 8/1990 | Tomko et al. |
| 5,034,443 A | 7/1991 | Bae et al. |
| 5,227,417 A | 7/1993 | Kroushl, III |
| 5,338,791 A | 8/1994 | Chaplin |
| 5,342,874 A | 8/1994 | Chaplin et al. |
| 5,886,072 A | 3/1999 | Linsky et al. |
| 5,891,571 A | 4/1999 | Herbert |
| 6,080,929 A | 6/2000 | Fagouri et al. |
| 6,087,428 A | 7/2000 | Köhler |
| 6,150,447 A | 11/2000 | Cusack et al. |
| 6,245,846 B1 | 6/2001 | Daniels et al. |

*Primary Examiner*—Kriellion A. Sanders
(74) *Attorney, Agent, or Firm*—Michael P. Dilworth

(57) ABSTRACT

Heterocyclic tin compounds, useful as flame retardants and/or as smoke suppressants for halogen-containing polymers, e.g., polyvinyl chloride resins having application as wire and cable coatings, are obtained by reacting a trisubstituted triazine such as melamine with a tin-containing compound such as tin tetrachloride.

31 Claims, No Drawings

HETEROCYCLIC TIN FLAME RETARDANTS/SMOKE SUPPRESSANTS AND HALOGEN-CONTAINING POLYMER COMPOSITION CONTAINING SAME

BACKGROUND OF THE INVENTION

This invention relates to flame retardant/smoke suppressant additives for halogen-containing polymers such as polyvinyl chloride (PVC).

PVC is an inherently flame retardant polymer but some additives, especially plasticizers and process aids, may increase its flammability. Wire and cable in general and, in particular, plenum cable, require high flame retardancy and low smoke generation. To achieve these requirements, large amounts of flame retardants and smoke suppressants are conventionally added to PVC. Known flame and smoke retardants include such compounds as antimony oxide, molybdates and borates. However, antimony oxide is toxic, borates are relatively poor flame retardants and molybdates are expensive, factors which tend to militate against their use.

SUMMARY OF THE INVENTION

It is an object of the present invention to provide a new high performance additive which imparts excellent flame retardant and smoke suppressant properties in halogen-containing polymers.

It is a particular object of the invention to provide compositions of halogen-containing polymers such as PVC, especially PVC compositions employed as wire and cable coatings, containing a heterocyclic tin compound as a flame retardant and/or smoke suppressant additive.

It is another object of the invention to provide a flame retardant and/or smoke suppressant additive for the insulation layer of an electrically conductive wire or cable product.

It is yet another object of the invention to provide a PVC composition with largely improved heat stabilization by the addition of perchlorates.

In keeping with these and other objects of the invention, there is provided a halogen-containing polymer composition comprising a halogen-containing polymer and a flame retardant-effective and/or smoke suppressant-effective amount of heterocyclic tin compound obtained from the reaction of (i) a trisubstituted triazine compound of the general formula:

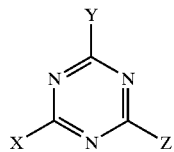

wherein X, Y and Z each independently is a halogen atom, hydroxyl group, amine group or monovalent moiety containing at least one halogen atom, hydroxyl group and/or amine group, with (ii) a tin-containing compound selected from the group consisting of tin chlorides, tin bromides, tin fluorides, tin iodides, tin hydroxides and tin oxides.

The foregoing heterocyclic tin compound imparts excellent flame retardant and smoke suppressant properties to halogen-containing polymers such as PVC when used alone and/or in combination with other flame retardant additives.

DETAILED DESCRIPTION OF THE INVENTION

In accordance with the invention, the heterocyclic tin flame retardant/smoke suppressant additive is prepared by reacting (i) a trisubstituted triazine compound with (ii) a tin-containing compound as generally described above.

Trisubstituted triazine compound (i) possesses the general formula:

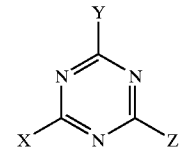

wherein X, Y and Z are as defined above. Thus, e.g., one or more of X, Y and Z can be a halogen atom, advantageously selected from among chlorine and bromine, a hydroxyl group, a primary amine group or a substituted amine group (i.e., a secondary or tertiary amine group) in which the amine nitrogen is bonded directly to a carbon atom of the triazine ring. One or more of the foregoing halogen, hydroxyl and amine substituents can also be part of the structure of a monovalent moiety which is bonded to a carbon atom of the triazine ring by a carbon-carbon bond. The monovalent moiety can, e.g., be an alkyl, cycloalkyl, aromatic or heterocyclic group. Examples of such groups include methyl, ethyl, propyl, isopropyl, butyl, pentyl, hexyl, octyl, nonyl, decyl, cyclopentyl, cycohexyl, phenyl, benzyl, tolyl, xylyl, naphthyl, pyridyl, and the like. These and other monovalent moieties, in addition to containing halogen, hydroxyl and/or amine, can contain one or more other substituents such as etheric oxygen, ester linkages, amide linkages, nitrile, and the like. Trisubstituted triazine compound (i) can also be used in the form of one of its salts, e.g., the hydrochloride salt, the acetate salt, and so forth.

Preferred trisubstituted triazine compounds (i) include melamine, N-substituted melamines, methylol-modified melamine, cyanuric acid, O-substituted cyanuric acid, amilide, amiline, melam and the salts thereof.

Tin-containing compound (ii) can be an anhydrous or hydrated tin tetrahalide, tin hydroxide, tin oxide, stannic acid or a metal stannate in which the metal can be, e.g., an alkali metal such as lithium, sodium or potassium, an alkaline earth metal such as calcium, magnesium or barium, and the like, or zinc, aluminum or iron. Useful tin-containing compounds include $HSnO_3$, $Sn(OH)_4$, $H_2SnO_3$, $SnO_2$, $MeHSnO_3$ and $MeSnO_3$ wherein Me can be any of the following: potassium, lithium, magnesium, calcium, zinc, sodium, barium, bismuth, strontium, iron, cobalt, nickel or copper.

The substituted triazine and tin-containing reactants are conventionally reacted in water and/or inert organic solvent at suitable temperatures and pressures, e.g., −10 to 150° C., and preferably at 20 to 100° C., at ambient or slightly elevated pressures (up to 5 bar) to provide the heterocyclic tin-containing compound of this invention as a precipitate. When a triazine salt is employed as a reactant, e.g., melamine hydrochloride or melamine acetate, the reaction will ordinarily be carried out in the presence of base, e.g., an alkali metal hydroxide such as sodium hydroxide, as an acid acceptor. Following the reaction, the precipitated reaction product can be isolated and, if desired, purified employing known and conventional means, e.g., filtration, washing of the product and drying.

Particularly preferred resins to which the compounds of this invention are added are the chlorine-containing polymers, particularly PVC, and compositions containing these resins, employed as insulation for wire and cable products.

The heterocyclic tin compounds will be employed in the halogen-containing resin in at least a flame retardant-effective and/or a smoke suppressant-effective amount. In general and for most applicants, such amount can vary from about 5 to about 50 and preferably from about 10 to about 30 parts per hundred (PHR), by weight of the halogen-containing resin.

The polymers or resins to which the flame retardant/fire suppressant compounds of this invention are added, optionally in combination with one or more known or conventional flame retardant/fire suppressant additives are the halogen-containing organic polymers. These polymers include homopolymers such as the polyvinyl chloride-type polymers, e.g., polyvinyl chloride. These polymers can also include copolymers formed by the copolymerization of vinyl chloride with other unsaturated monomers. Unsaturated monomers can be compounds which contain polymerizable carbon-to-carbon double bonds and include alpha olefins such as ethylene, propylene and 1-hexene; acrylates, such as acrylic acid, ethyl acrylate, acrylonitrile; vinyl monomers, such as styrene, vinyl acetate and/or maleates such as maleic acid, maleic anhydride and malice esters.

In addition to the heterocyclic tin compound of this invention, one or more other additives can be present in the halogen-containing polymer. These other additives can be selected from the group consisting of fillers, heat stabilizers, lubricants, plasticizers and pigments.

Examples of fillers can be one or more of the group consisting of calcium carbonate, dolomite, wollastonite, magnesium oxide, magnesium hydroxide, silicates, clay, talc, glass fibers, glass beads, wood flour, mica, metal oxides, or metal hydroxides, carbon black, graphite, rock flour, heavy spar, glass fibers, talc, kaolin and chalk. The fillers can be employed in an amount of preferably at least 1 part, for example, from 5 to 200, judiciously from 10 to 150 and in particular, from 15 to 100 parts by weight per 100 parts by weight of PVC.

Examples of heat stabilizers are metal soaps of relatively long-chain carboxylic acids. Familiar examples are stearates and laureates, and also oleates. Alkyl benzoic acids are also said to be included under metal soaps. Metals that may be mentioned are Li, Na, K, Mg, Ca, Sr, Ba, Zn, Al, Cd and Pb. Use is often made of what are known as synergistic mixtures, such as barium/zinc, magnesium/zinc, calcium/zinc, cadmium/barium, cadmium/calcium, cadmium/barium/zinc, cadmium/calcium/zinc or calcium/magnesium/zinc stabilizers. The metal soaps can be employed individually or in mixtures.

Examples which may be mentioned are the zinc, calcium, magnesium or barium salts of monovalent carboxylic acids such as acetic, propionic, butyric, valeric, hexanoic, enanthic, octanoic, neodecanoic, 2-ethylhexanoic, pelargonic, decanoic, undecanoic, dodecanoic, tridecanoic, myristic, palmitic, isostearic, stearic, 12-hydroxystearic, behenic, benzoic, p-tert-butylbenzoic, N,N-dimethylhydroxybenzoic, 3,5-di-tert-butyl-4-hydroxybenzoic, toulic, dimethylbenzoic, ethylbenzoic, n-propylbenzoic, salicylic, p-tert-octysalicylic and sorbic acid; calcium, magnesium and zinc salts of the monoesters of divalent, carboxylic acids such as oxalic, malonic, succinic, glutaric, adipic, fumaric, pentane-1,5-dicarboxylic, hexane-1,6-dicarboxylic, heptane-1,7-dicarboxylic, octane-1,8-dicarboxylic, phthalic, isophthalic, terephthalic and hydroxyphthalic acid; and of the di- or triesters of the tri- or tetravalent carboxylic acids such as hemimellitic, trimellitic, pyromellitic and citric acid. Preference is given to calcium, magnesium and zinc carboxylates of carboxylic acids having 7 to 18 carbon atoms (metal soaps in the narrow sense), such as, for example, benzonates or alkanoates, preferably stearate, oleate, laureate, palmitate, behenate, hydroxystrearates, dihydroxystearates or 2-ethylhexanoate. Particular preference is given to stearate, oleate and p-tert-butylbenzonate. Overbased carboxylates, such as overbased zinc octoate, barium nonyl phenate, barium oleate, calcium oleate are also preferred. If desired, it is also possible to employ a mixture of carboxylates of different structures. Preference is given to compositions, as described, comprising a zinc and/or calcium compound. As heat stabilizer alkyltin mercapto carboxylates or carboxylates can be used, preferably mono or di methyl, butyl, octyl tin derivatives with alkyl thioglycolates, alkyl mercaptopropionates and carboxylates.

Examples of lubricants can be selected from the group consisting of montan wax, fatty acid esters, PE waxes, amide waxes, chlorinated paraffins, glycerol esters, fatty ketones, silicone-based lubricants and combinations thereof. Calcium stearate is preferred.

Examples of plasticizers can be selected from the group consisting of phthalates, esters of aliphatic dicarboxylic acids, trimellitates, epoxy plasticizers, polymer placticizers, phosphoric esters, paraffins, hydrocarbons, monoesters and glycol esters.

Examples of pigments can be selected from the group consisting of $TiO_2$ zirconium oxide-based pigments, $BaSO_4$, zinc oxide (zinc white) and lithopones (zinc sulfide/barium sulfate), carbon black, carbon black/titanium dioxide mixtures, iron oxide pigments, $Sb_2O_3$, $(Ti,Ba,Sb) O_2$, $Cr_2O_3$ spinels, such as cobalt blue and cobalt green, Cd (S,Se), ultramarine blue, organic pigments for example, azo pigments, phthalo-cyanine pigments, quinacridone pigments, perylene pigments, diketopyrrolopyrrole pigments and anthraquinone pigments.

The additive herein is advantageously combined with a perchlorate heat stabilizer, preferred perchlorates being sodium, zinc, barium and magnesium perchlorates, in known and conventional amounts.

The following examples illustrate the preparation of heterocyclic tin compounds of this invention and the use of the compounds as stabilizers for PVC to which they impart increased flame retardant and smoke suppressant activity.

EXAMPLE 1

Melamine (120 g) was suspended in 1100 ml of water in 2 l flask and with agitation was heated to 30° C. Slowly 248 g of anhydrous tin tetrachloride was added and the temperature was allowed to go to 70° C. The batch was agitated at 70° C. for 45 minutes and 304.6 g of aq. NaOH (50%) was slowly added over 1.5 hours. The reaction was held at 75–85° C. for three hours and was then cooled and filtered. The wet cake was re-slurried in the water (1:1), filtered and washed with 300 ml water. It was dried for 16 hours at 80° C. and 271 g of white powder was obtained. Elemental analysis showed % C 11.54, % H 2.73, % N 25.89, % Sn 41.45, (Product 1).

EXAMPLE 2

Melamine (126 g), 740 ml of water and 160 g 50% NaOH were mixed in a 2 l flask and heated to 30° C. with agitation. Slowly, 260 g of anhydrous tin tetrachloride was added and the temperature was allowed to go to 73° C. The reaction was stirred at 70° C. for 45 minutes and 160 g of aq. NaOH (50%) was slowly added over 15 minutes. The batch was held at 75–85° C. for three hours and then cooled and filtered. The wet cake was re-slurried in the water (1:1), and re-filtered and washed with 300-ml of water. The cake was then dried for 16 hours at 80° C. 271 g of white powder was obtained with the following elemental analysis; % C 11.96, % H 2.67, % N 27.48, % Sn 42.02, (Product 2).

EXAMPLE 3

Melamine (25.2 g, 0.2M), 250 ml of water and 24 g acetic acid (0.4M) were mixed and heated to 80° C. To a clear solution of melamine acetate, 53.5 g of $Na_2Sn(OH)_6$, dissolved in 150 ml water, was added over a period of 1 hour at 80–85° C. The batch was further agitated at 80–85° for 1 hour and 45 minutes. It was then cooled to 50° C. and then filtered and washed with water. It was then dried for 16 hours at 105° C. 50 g of white powder was obtained with the following elemental analysis % C 14.01, % H 3.07, % N 29.65, % Sn 30.51, (Product 3).

EXAMPLE 4

Melamine (126 g, 1 M) and 1985 ml 1.0075 molar hydrochloric acid were mixed in 3 l flask and heated to 83° C. To the clear solution of melamine hydrochloride, 266 g of solid $Ns_2Sn(OH)_6$ (1M) was added over 10 minutes at 83–87° C. The batch was agitated at 83–90° C. for an additional 4 hours and then cooled to room temperature and filtered. The wet cake was then re-slurried in 800 ml of water and re-filtered. It was re-slurried in 300 ml water yet again and filtered once more. The cake was then dried for 16 hours at 80° C. 262 g of white powder was obtained with the following elemental analysis % C 12.46, % H 2.16, % N 28.81, % Sn 35.4, (Product 4).

EXAMPLE 5

Melamine (126 g, 1M) and 1925 ml 1.039 molar hydrochloric acid were mixed in 3 l flask and heated with agitation to 87° C. To the clear solution of melamine hydrochloride, 266 g of solid $Ns_2Sn(OH)_6$ (1M) was added over 5 minutes at 87–93° C. The batch was then agitated at 87–90° C. for 5 hours. It was then cooled to room temperature and was settled overnight. The supernatant was decanted off and the solids were re-slurried in 200-ml of water for 30 minutes at 65° C. and then filtered and washed twice with 200-ml water. It was then dried for 8 hours at 105° C. 260 g of white powder was obtained with the following elemental analysis % C 11.88, % H 2.47, % N 27.13, % Sn 43.33, (Product 5).

EXAMPLE 6

Cyanuric acid (25.8 g, 0.2M), 270 ml of water and 32 g NaOH (0.8M) were mixed in 500 ml flask, and with agitation the mixture was heated to 80° C. Slowly, 70 g (0.2M) tin tetrachloride pentahydrate, dissolved in 130 ml water, was added over 15 minutes at 80–85° C., and the batch was agitated at 80–85° C. for 5 hours. The batch was cooled, filtered and washed with water and dried for 16 hours at 80° C. 47 g of white powder was obtained with the following elemental analysis % C 11.13, % H 1.38, % N 12.87, % Sn 45.85, (Product 6).

EXAMPLE 7

Cyanuric acid (129 g, 1M), 1280 ml of water and 320 g 50% NaOH (4M) were mixed in 3 l flask and with agitation the mixture was heated to 70° C. Slowly, 350.6 g (1M) tin tetrachloride pentahydrate, dissolved in 700 ml water, was added over 30 minutes at 70–87° C. The batch was then agitated at 80–85° C. for 4 hours. The batch was then cooled at 70° C. and filtered. The wet cake was re-slurried in 1500-ml of water for 30 min at 50–60° C. and filtered, washed with water and dried for 16 hours at 100° C. 272 g of white powder was obtained with the following elemental analysis % C 11.35, % H 1.42, % N 13.22, % Sn 41.02, (Product 7).

In Tables I–V below, the abbreviations therein have the following meanings:
Limiting Oxygen Index (LOI)
Time to ignition (TTI)
Peak heat release rate (HRR)
Total heat release (HR)
Average heat of combustion (Ave. H.C.)
Average Specific Extinction Area (Ave. SEA)
Total Smoke release (SR)

Tables I, II, and III represent the heat stability of three different PVC formulations, intended for general wire and cable coating applications, containing some of the tin-melamine and tin-cyanuric acid products of the above examples. Flame retardant performance was measured by the LOI test and heat stability was conducted at 400° F. and presented by the yellowness index. Heat stability data of PVC compounds containing heterocyclic tin flame-retardants and smoke suppressants showed improvement in heat stability by the addition of sodium perchlorate, as is summarized in the tables below.

TABLE I

| TIME | No. Add | Product 4 (10 PHR) | Product 4 (10 PHR) + NaClO$_4$ (60%) 2 PHR | Product 6 (10 PHR) | Product 6 (10 PHR) + NaClO$_4$ (60%) 2 PHR | Formulation | |
|---|---|---|---|---|---|---|---|
| | | | YELLOW INDEX | | | | |
| 0 | 22.8 | 20.6 | 20.1 | 21.4 | 21.9 | PVC[1] | 100 |
| 30 | 41.8 | 35.3 | 30 | 47.5 | 44.2 | Plasticizer[2] | 45 |
| 60 | 46.2 | 46.6 | 37 | 62.1 | 52.6 | Clay | 12 |
| 90 | 52.6 | 54.7 | 40.1 | 64.6 | 56.1 | Lead[3] | |
| LOI | 27 | 29.3 | 30.4 | 31.1 | 30.3 | Stabilizer | 5 |
| | | | | | | Lubricant[4] | 0.2 |

[1]PVC: Geon 30 (KV68.9, from PolyOne Corporation)
[2]Plasticizer: tris nonyl trimellitate
[3]Dythal (dibasic lead phthalate)
[4]Lubricant: stearic acid

TABLE II

| TIME | No. Add | Product 4 (10 PHR) | Product 4 (10 PHR) + NaClO₄ (60%) 2 PHR | Product 6 (10 PHR) | Product 6 (10 PHR) + NaClO₄ (60%) 2 PHR | Formulation | |
|---|---|---|---|---|---|---|---|
| | | | YELLOW INDEX | | | | |
| 0 | 18.7 | 13.05 | 13.23 | 13.85 | 12.75 | PVC[1] | 100 |
| 30 | 50.34 | 48.11 | 26.8 | 38.34 | 32.12 | Phosphate | |
| 60 | 69.04 | 62.05 | 40 | 47.39 | 42.22 | Ester[2] | 5 |
| 90 | 75.47 | | 49.6 | 57.09 | 48.46 | Bromoester | 10 |
| LOI | 33.3 | 48.3 | 49 | 51.9 | 55.3 | Lubricant[3] | 0.25 |
| | | | | | | Plasticizer[4] | 33 |
| | | | | | | Clay | 5 |
| | | | | | | Lead[5] | |
| | | | | | | Stabilizer | 6 |
| | | | | | | Sb₂O₃ | 5 |
| | | | | | | Zinc Borate | 2 |
| | | | | | | ATH | 70 |

[1]PVC: Geon 30
[2]Santisizer 2148, a phosphate plasticizer from Solutia Inc.
[3]Stearic acid
[4]Hercoflex 707A plasticizer, Aqualon Dir. of Hercules Incorporated
[5]Lectro 90TA, Synpiron

TABLE III

| TIME | No. Add | Product 1 (15 PHR) | Product 4 (15 PHR) + NaClO₄ (60%) 2 PHR | Product 6 (15 PHR) + NaClO₄ (60%) 2 PHR | AOM | Formulation | |
|---|---|---|---|---|---|---|---|
| | | | YELLOW INDEX | | | | |
| 0 | | 16.31 | 18.7 | 17.6 | 5.11 | PVC | 100 |
| 30 | | 35.54 | 30.36 | 29.5 | 37.25 | Phosphate | |
| 60 | | 42.66 | 36.8 | 35.7 | | Ester | 10 |
| 90 | | 51.18 | 41.6 | 40.6 | | Bromoester | 20 |
| LOI | 35.5 | 37.3 | 37.9 | — | 40.1 | ATH | 70 |
| | | | | | | Plasticizer | 45 |
| | | | | | | Sb₂O₃ | 3 |
| | | | | | | Ba/Ca/Zn Stabilizer | 8 |
| | | | | | | Zinc Borate | 5 |
| | | | | | | | 40 |

In order to assess whether the novel heterocyclic tin compound exhibits any significant improvements in fire retardant performance and smoke suppressant performance, the various products of the above-examples were evaluated at different levels of additives shown in Tables IV and V below.

TABLE IV

| Formulation: | |
|---|---|
| PVC | 100 |
| Plasticizers | 45 |
| Brominated Ester | 20 |
| Phosphate Ester | 10 |
| ATH | 70 |
| BaCaZn Stabilizers | 8 |
| Fire Retardance (Fr) | From Table |

| FR | Product 4 | Product 4 | Product 4 | Product 1 | AOM Control | No FR |
|---|---|---|---|---|---|---|
| FR, PHR | 18 | 15 | 12 | 15 | 15 | 0 |
| Sb₂O₃, PHR | 3 | 3 | 3 | 3 | 3 | 0 |
| Zn Borate, PHR | 5 | 5 | 5 | 5 | 5 | 0 |
| Properties | | | | | | |
| LOI | 38.4 | 37.3 | 37.3 | 37.1 | 40.1 | 29.5 |
| TTI Sec | 37 | 35 | 38 | 36 | 27 | 23 |
| Peak HRR KW m² | 142 | 140 | 148 | 131 | 106 | 137 |

TABLE IV-continued

| | | | | | | |
|---|---|---|---|---|---|---|
| Total HR MJ m² | 40.7 | 37.9 | 46 | 41.4 | 48 | 45.4 |
| Ave. H.C MJ kg | 10.3 | 9.8 | 12 | 10.7 | 11.6 | 13.7 |
| Ave. SEA M² kg | 322 | 336 | 346 | 317 | 393 | 523 |
| Total SR | 1041 | 1077 | 1152 | 1061 | 1248 | 1694 |
| Mass Loss. % | 62.9 | 63.3 | 64.1 | 66 | 63.7 | 74.9 |

TABLE V

| FR | Product 4 | Product 6 | Product 4 | Product 6 | Flame-retardant II |
|---|---|---|---|---|---|
| FR, PHR | 15 | 15 | 15 | 15 | 15 |
| Sb₂O₃, PHR | 3 | 3 | 3 | 3 | 3 |
| Zn Borate, PHR | 5 | 5 | 5 | 5 | 5 |
| NaClO₄ (60%), PHR | 0 | 0 | 2 | 2 | 0 |
| LOI | 35.8 | 37.2 | 36.2 | 36.9 | 39.2 |
| TTI Sec | 34 | 35.5 | 34 | 39 | 58.5 |
| Peak HRR KW/m² | 147 | 145 | 156 | 145 | 162 |
| Total HR MJ/m² | 36.6 | 49.7 | 37.6 | 47.3 | 47.7 |
| Ave. H.C MJ/kg | 9.4 | 12.8 | 9.6 | 12.3 | 11.7 |
| Ave. SEA M²/kg | 321 | 409 | 365 | 390 | 487 |
| Total SR | 978 | 1296 | 1158 | 1262 | 1427 |
| Mass Loss % | 60.6 | 63.4 | 63.1 | 62.3 | 57.6 |

What is claimed is:

1. A halogen-containing polymer composition comprising a halogen containing polymer and a flame retardant-effective and/or smoke-suppressant-effective amount of a heterocyclic tin compound obtained from the reaction of (i) a substituted triazine compound of the formula:

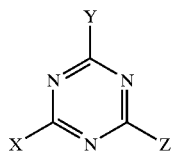

wherein X, Y and Z each independently is a halogen atom, hydroxyl group, amine group or monovalent moiety containing at least one halogen atom, hydroxyl group and/or amine group, with (ii) a tin-containing compound selected from the group consisting of tin chlorides, tin bromides, tin fluorides, tin iodides, tin hydroxides and tin oxides.

2. The polymer composition of claim 1 wherein one or more of X, Y, and Z is chlorine, bromine, a hydroxyl group, a primary amine group or a substituted amine group in which the amine nitrogen is bonded directly to a carbon atom of the triazine ring.

3. The polymer composition of claim 1, wherein one or more of X, Y and Z is a monovalent moiety bonded to a carbon atom of the triazine ring by a carbon-carbon bond, said monovalent moiety possessing at least one halogen atom, hydroxyl group, amine group or combination of the foregoing.

4. The polymer composition of claim 3 wherein the monovalent moiety is an alkyl, cycloalkyl, aromatic or heterocyclic group.

5. The polymer composition of claim 3 wherein the monovalent moiety is methyl, ethyl, propyl, isopropyl, butyl, pentyl, hexyl, octyl, nonyl, decyl, cyclopentyl, cycohexyl, phenyl, benzyl, tolyl, xylyl, naphthyl or pyridyl.

6. The polymer composition of claim 1, wherein the trisubstituted triazine is selected from the group consisting of melamine, N-substituted melamines, methylol-modified melamine, cyanuric acid, O-substituted cyanuric acid, amilide, amiline and melam.

7. The polymer composition of claim 1 wherein the tin-containing compound is selected from the group consisting of anhydrous tin tetrachlorides, tetrabromides, tetrafluorides and tetraiodides and hydrated tetrachlorides, tetrabromides, tetrafluorides and tetraiodides.

8. The polymer composition of claim 1 wherein tin-containing compound (ii) is $HSnO_3$, $Sn(OH)_4$, $H_2SnO_3$, $SnO_2$, $MeHSnO_3$ or $MeSnO_3$ in which Me is selected from the group consisting of potassium, lithium, magnesium, calcium, zinc, sodium, barium, bismuth, strontium, iron, cobalt, nickel and copper.

9. The polymer composition of claim 1 wherein the halogen containing polymer is a polyvinyl chloride, vinylidene chloride, chlorinated PVC, chlorinated rubber, chloroprene or chlorinated polyolefin.

10. The polymer composition of claim 1 wherein the heterocyclic tin compound is combined with at least one other additive.

11. The polymer composition of claim 10 wherein the additive is at least one member selected from the group consisting of filler, heat stabilizer, metal soap, lubricant, plasticizer, pigment and metal perchlorate.

12. The polymer compound of claim 11 wherein the filler is selected from the group consisting of metal carbonate, wollastonite, silicates, china clay, talc, glass fibers, glass beads, wood flour, mica, metal oxides, or metal hydroxides, carbon black, graphite, rock flour, glass fibers, kaolin and chalk.

13. The polymer composition of claim 11 wherein the heat stabilizer is a metal carboxylate.

14. The polymer composition of claim 13 wherein the metal of the metal carboxylate is selected from the group consisting of Li, Na, K, Mg, Ca, Sr, Ba, Zn, and Al.

15. The polymer composition of claim 11 wherein the lubricant is selected from the group consisting of montan wax, fatty acid esters, PE waxes, amide waxes, chlorinated paraffins, glycerol esters, fatty acids, silicone-based lubricants and combinations thereof.

16. The polymer composition of claim 11 wherein the plasticizer is selected from the group consisting of phthalates, esters of aliphatic dicarboxylic acids, trimellitates, citrates, epoxy plasticizers, phosphoric esters, paraffins, hydrocarbons, monoesters, pentaerythritolesters and glycol esters.

17. The polymer composition of claim 11 wherein the pigment is selected from the group consisting of $TiO_2$ zirconium oxide-based pigments, Ba $SO_4$ zinc oxide (zinc white) and lithopones (zinc sulfide/barium sulfate), carbon black, carbon black/titanium dioxide mixtures, iron oxide pigments, $Sb_2O_3$, $(Ti,Ba,Sb)\ O_2$, $Cr_2\ O_3$ spinels, such as cobalt blue and cobalt green, $Cd(S,Se)$, ultramarine blue, organic pigments such as, azo pigments, phthalo-cyanine, pigments, quinacridone pigments, perylene pigments, diketopyrrolopyrrole pigments and anthraquinone pigments.

18. The polymer composition of claim 11 wherein the perchlorate is selected from the group consisting of metal perchlorates of Na, Li, K, Ca, Ba, Zn, Sr, and Al.

19. An electrically conductive wire or cable possessing an insulation component comprising the polymer composition of claim 1.

20. An electrically conductive wire or cable possessing an insulation component comprising the polymer composition of claim 9.

21. An electrically conductive wire or cable possessing an insulation component comprising the polymer composition of claim 11.

22. A heterocyclic tin compound obtained from the reaction of (i) a substituted triazine compound of the formula:

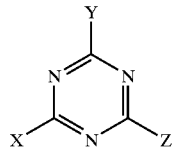

wherein X, Y and Z each independently is a halogen atom, hydroxyl group, amine group or monovalent moiety containing at least one halogen atom, hydroxyl group and/or amine group, with (ii) a tin-containing compound selected from the group consisting of tin chlorides, tin bromides, tin fluorides, tin iodides, tin hydroxides and tin oxides.

23. The heterocyclic tin compound of claim 22 wherein one or more of X, Y, and Z is chlorine, bromine, a hydroxyl group, a primary amine group or a substituted amine group in which the amine nitrogen is bonded directly to a carbon atom of the triazine ring.

24. The heterocyclic tin compound of claim 22, wherein one or more of X, Y and Z is a monovalent moiety bonded to a carbon atom of the triazine ring by a carbon-carbon bond, said monovalent moiety possessing at least one halogen atom, hydroxyl group, amine group or combination of the foregoing.

25. The heterocyclic tin compound of claim 24 wherein the monovalent moiety is an alkyl, cycloalkyl, aromatic or heterocyclic group.

26. The heterocyclic tin compound of claim 24 wherein the monovalent moiety is methyl, ethyl, propyl, isopropyl, butyl, pentyl, hexyl, octyl, nonyl, decyl, cyclopentyl, cycohexyl, phenyl, benzyl, tolyl, xylyl, naphthyl or pyridyl.

27. The heterocyclic tin compound of claim 22, wherein the trisubstituted triazine is selected from the group consisting of melamine, N-substituted melamines, methylol-modified melamine, cyanuric acid, O-substituted cyanuric acid, amilide, amiline and melam.

28. The heterocyclic tin compound of claim 22 wherein the tin-containing compound is selected from the group consisting of anhydrous tin tetrachlorides, tetrabromides, tetrafluorides and tetraiodides and hydrated tin tetrachiorides, tetrabromides, tetrafluorides and tetraiodides.

29. The heterocyclic tin compound of claim 22 wherein tin-containing compound (ii) is $HSnO_3$, $Sn(OH)_4$, $H_2SnO_3$, $SnO_2$, $MeHSnO_3$ or $MeSnO_3$ in which Me is selected from the group consisting of potassium, lithium, magnesium, calcium, zinc, sodium, barium, bismuth, strontium, iron, cobalt, nickel and copper.

30. A flame retardant and/or smoke suppressant composition for halogen-containing polymer which comprises a flame retardant-effective and/or smoke suppressant-effective amount of at least one heterocyclic tin compound of claim 22 and at least one other additive.

31. The flame retardant and/or smoke suppressant composition of claim 30 wherein the other additive is selected from the group consisting of filler, heat stabilizer, metal soap, lubricant, plasticizer, pigment, and metal perchlorate.

* * * * *